US006879963B1

(12) United States Patent
Rosenberg (10) Patent No.: US 6,879,963 B1
(45) Date of Patent: Apr. 12, 2005

(54) CROSS CHANNEL DELIVERY SYSTEM AND METHOD

(75) Inventor: Jeremy Rosenberg, Havre de Grace, MD (US)

(73) Assignee: Music Choice, Horsham, PA (US)

( * ) Notice: Subject to any disclaimer, the term of this patent is extended or adjusted under 35 U.S.C. 154(b) by 0 days.

(21) Appl. No.: 09/547,846

(22) Filed: Apr. 12, 2000

(51) Int. Cl.[7] .............................................. G06F 17/60
(52) U.S. Cl. ........................................................ 705/26
(58) Field of Search ...................... 705/26, 27; 725/86, 725/105, 135

(56) References Cited

U.S. PATENT DOCUMENTS

| | | |
|---|---|---|
| 4,127,796 A | 11/1978 | Henderson |
| RE29,997 E | 5/1979 | den Toonder |
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |
| 4,722,005 A | 1/1988 | Ledenbach |
| 4,760,455 A | 7/1988 | Nagashima |
| 4,799,156 A | 1/1989 | Shavit et al. |
| 5,130,615 A | 7/1992 | George |
| 5,193,006 A | 3/1993 | Yamazaki |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,481,296 A | 1/1996 | Cragun et al. |
| 5,534,911 A | 7/1996 | Levitan |
| 5,550,863 A | 8/1996 | Yurt et al. |
| 5,557,541 A | 9/1996 | Schulhof et al. |
| 5,572,442 A | 11/1996 | Schulhof et al. |
| 5,585,866 A | 12/1996 | Miller et al. |
| 5,590,282 A | 12/1996 | Clynes |

(Continued)

FOREIGN PATENT DOCUMENTS

| | | | |
|---|---|---|---|
| EP | 1 022 900 A1 | 7/2000 | |
| WO | WO 97/37492 A1 | 10/1997 | |
| WO | WO 9917230 | * 4/1999 | ........... G06F/17/30 |
| WO | WO 99/48296 | 9/1999 | |
| WO | WO 99/48296 A1 | 9/1999 | |
| WO | WO 00/07368 | 2/2000 | |
| WO | WO 01/36064 | 5/2001 | |
| WO | WO 01/0035874 | 5/2001 | |

OTHER PUBLICATIONS

"Set–top box for television that reads your mind", Taylor, Paul. Dec. 30, 1998. Financial Times; London.*
"Global Media Announces Launch of Independent Internet Radio station; Station Includes E–Commerce Point of Purchase for Music" (Feb. 1, 1999. Business Wire).*
"Platinum Entertainment and Liquid Audio Join Forces to Offer Extensive Music Catalog via Digital Downloads" (Jul. 15, 1998. PR Newswire).*

(Continued)

*Primary Examiner*—Jeffrey A. Smith
*Assistant Examiner*—Matthew S Gart
(74) *Attorney, Agent, or Firm*—Rothwell Figg Ernst & Manbeck (57) ABSTRACT

Methods and systems consistent with the present invention provide a cross channel fulfillment system that enables consumers to purchase and receive items using different transmission mediums. The fulfillment system is a centralized distribution system that maintains information relating to consumers and has access to multiple transmission mediums. Specifically, the fulfillment system contains a database of consumer contact information relating to each transmission medium. The fulfillment system uses a remote device to provide information to consumers. The remote device transmits and receives broadcast messages including information relating to purchasable items. The fulfillment system may deliver a purchased item to the consumer using a medium different from that used to purchase the item.

21 Claims, 7 Drawing Sheets

U.S. PATENT DOCUMENTS

| | | |
|---|---|---|
| 5,592,511 A | 1/1997 | Schoen et al. |
| 5,616,876 A | 4/1997 | Cluts |
| 5,617,565 A | 4/1997 | Augenbraun et al. |
| 5,629,867 A | 5/1997 | Goldman |
| 5,635,989 A | 6/1997 | Rothmuller |
| 5,636,276 A | 6/1997 | Brugger |
| 5,675,734 A | 10/1997 | Hair |
| 5,708,780 A | 1/1998 | Levergood et al. |
| 5,721,815 A | 2/1998 | Ottesen et al. |
| 5,726,909 A | 3/1998 | Krikorian |
| 5,734,719 A | 3/1998 | Tsevdos et al. |
| 5,734,961 A | 3/1998 | Castille |
| 5,751,282 A | 5/1998 | Girard et al. |
| 5,754,939 A | 5/1998 | Herz et al. |
| 5,761,606 A | 6/1998 | Wolzien |
| 5,761,607 A | 6/1998 | Gudesen |
| 5,761,662 A | 6/1998 | Dasan |
| 5,781,889 A | 7/1998 | Martin et al. |
| 5,784,595 A | 7/1998 | Devins et al. |
| 5,790,935 A | 8/1998 | Payton |
| 5,793,980 A | 8/1998 | Glaser et al. |
| 5,809,144 A | 9/1998 | Sirbu et al. |
| 5,809,246 A | 9/1998 | Goldman |
| 5,819,049 A | 10/1998 | Reietmann |
| 5,819,160 A | 10/1998 | Foladare et al. |
| 5,835,487 A | 11/1998 | Campanella |
| 5,841,979 A | 11/1998 | Schulhof et al. |
| 5,848,398 A | 12/1998 | Martin et al. |
| 5,861,906 A | 1/1999 | Dunn et al. |
| 5,878,141 A * | 3/1999 | Daly et al. ................ 235/379 |
| 5,890,137 A | 3/1999 | Koreeda |
| 5,890,139 A | 3/1999 | Suzuki et al. |
| 5,899,699 A | 5/1999 | Kamiya |
| 5,899,980 A | 5/1999 | Wilf et al. |
| 5,900,830 A | 5/1999 | Scheffler |
| 5,918,213 A | 6/1999 | Bernard et al. |
| 5,926,624 A | 7/1999 | Katz et al. |
| 5,930,765 A | 7/1999 | Martin |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. |
| 5,959,945 A | 9/1999 | Kleiman |
| 5,960,411 A | 9/1999 | Hartman et al. |
| 5,961,662 A | 10/1999 | Yamaguchi et al. |
| 5,968,120 A | 10/1999 | Guedalia |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. |
| 5,986,692 A | 11/1999 | Logan et al. |
| 5,991,374 A | 11/1999 | Hazenfield |
| 5,991,737 A | 11/1999 | Chen |
| 6,011,761 A | 1/2000 | Inoue |
| 6,011,854 A | 1/2000 | Van Ryzin |
| 6,021,432 A | 2/2000 | Sizer et al. |
| 6,025,868 A | 2/2000 | Russo |
| 6,038,591 A | 3/2000 | Wolfe et al. |
| 6,055,314 A | 4/2000 | Spies et al. |
| 6,055,566 A | 4/2000 | Kikinis |
| 6,085,235 A | 7/2000 | Clarke et al. |
| 6,088,455 A | 7/2000 | Logan et al. |
| 6,088,722 A | 7/2000 | Herz et al. |
| 6,105,060 A | 8/2000 | Rothblatt |
| 6,135,646 A | 10/2000 | Kahn et al. |
| 6,151,634 A | 11/2000 | Glaser et al. |
| 6,154,772 A | 11/2000 | Dunn et al. |
| 6,161,142 A | 12/2000 | Wolfe et al. |
| 6,192,340 B1 | 2/2001 | Abecassis |
| 6,223,292 B1 | 4/2001 | Dean et al. |
| 6,226,030 B1 | 5/2001 | Harvey et al. |
| 6,226,618 B1 | 5/2001 | Downs et al. |
| 6,229,895 B1 | 5/2001 | Son et al. |
| 6,232,539 B1 | 5/2001 | Looney et al. |
| 6,233,682 B1 * | 5/2001 | Fritsch ................ 713/168 |
| 6,240,553 B1 | 5/2001 | Son et al. |
| 6,243,725 B1 | 6/2001 | Hempleman et al. |
| 6,246,672 B1 | 6/2001 | Lumelsky |
| 6,249,810 B1 | 6/2001 | Kiraly |
| 6,253,235 B1 | 6/2001 | Estes |
| 6,253,237 B1 | 6/2001 | Story et al. |
| 6,262,772 B1 | 7/2001 | Shen et al. |
| 6,279,040 B1 | 8/2001 | Ma et al. |
| 6,286,139 B1 * | 9/2001 | Decinque ................ 725/5 |
| 6,305,020 B1 | 10/2001 | Horaty et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,369,851 B1 | 4/2002 | Marflak et al. |
| 2002/0023164 A1 | 2/2002 | Lahr |
| 2002/0023166 A1 | 2/2002 | Bar-Noy et al. |
| 2002/0038359 A1 | 3/2002 | Ihara et al. |
| 2002/0042107 A1 | 4/2002 | Palm |
| 2002/0056117 A1 | 5/2002 | Hasegawa et al. |
| 2002/0056118 A1 | 5/2002 | Hunter et al. |
| 2002/0059621 A1 | 5/2002 | Thomas et al. |
| 2002/0062261 A1 | 5/2002 | Mukai |

OTHER PUBLICATIONS

"Thinking Globally with a web–based radio station vying for listeners around the world, homegrown internet company fastband aims to shake up the music world" (LaFrance, Siona. Nov. 4, 1999. Times).*

"Tune into Yahoo! Radio; Yahoo! Teams up with Broadcast- .com and Spinner.com to Provide 10 Stations of Audio Programming" (May 11, 1999. business Wire).*

"Yahoo! Offers one–stop for e–music" (Aug. 25, 1999. Milwaukee Journal Sentinel).*

Yahoo! Press Release.*

"WebRadio.com Signs on as Liquid Music Network Affiliate Offering Liquid Audio Digital Downloads" (Sep. 1, 1999. Business Wire).*

"Blue Note Radio: Now Playing on a Computer Screen Near You. EMI's Blue Note Records Expands New Media Initiative with RadioWave.com" (Apr. 4, 2000. PR Newswire).*

"Sonicbox brings Net radio into your living room" (Partyka, Jeff. Oct. 12, 1999. CNN.com).*

"Internet Radio Listeners Unchained From Their PCs" (Olenick, Doug. Oct. 25, 1999. Twice Computer Technology).*

Sonicbox and Microsoft Windows Media Interent Radio to the home Stereo (Dec. 7, 1999. Microsoft Press Release).*

"Tune on, Tune in, Drop Cash" (King, Brad. Dec. 8, 2000. Wired News).*

"Computers and TV: Marriage of the Future" (Bernotas, Adolphe. Oct. 11, 1998. St. Louis Post).*

"An Introduction to Interactive Television" (Sweeney, John. 1994. International Broadcasting Convention).*

AudioRequest, MP3 Home Stereo Jukebox, ReQuest, Inc.–Company Info., and NSI–WHOIS Search Results. Pages from the web site for www.request.com owned by ReQuest, Inc., (6 pages)/.

Clark D., "Click Radio to Start Digital Music Service", WSJ Interactive Edition, Apr. 20, 2000, (2 pages).

"ClickRadio granted first interactive radio license by universal music group." From the web site at www.clickradio.com, printed Apr. 26, 2000, (2 pages).

Gordon, C. (2000). "Click radio sidesteps competition with music licensing deals." Atnewyork.com., (3 pages).

Press Release. (Dec. 13, 2000). "Phillips showcases click radio on digital set–top at western show 2000." Phillips.

Six pages from the web site for www.sonicnet.com.

ntl: Digital Radio. http://www.ntl.com/locales/gb/en/guides/dummies/produce.asp.

Bower (1998). "Digital Radio—A Revolution for In–Car Entertainment" Proc. NavPos Automative '98 Conf. 2(5–8): 40–51.

Deutsche Telekom AG: Digital Radio. http://www.telekom.de/dtag/ipl1/cda/level3_a/0,3680,10077,00.html.

The Eureka 147 Consortium. "Digital Audio Broadcasting" http://www.eureadab.org/eureka_147_consortium.htm, (3 pages).

Radio Authority (1999). Digital Radio Fact Sheet No. 4 http://www.radioauthority.org.uk/Information/Fact_Sheets/fs4.htm, (5 pages).

ICTV (2000). Digital Broadband System Press Release: 1–11.

Launch, "Discover New Music", http://www.launch.com/music/mymusic/pvn_conte . . . , (2 pages).

Rajapakshe, H. et al., "Video On Demand," Jun. 1995, pp. 1–15.

Welz, G., "Integrated Streaming Technologies," Oct. 30, 1996, pp. 1–3.

* cited by examiner

CROSS CHANNEL DELIVERY SYSTEM AND METHOD

BACKGROUND OF THE INVENTION

A. Field of the Invention

This invention relates generally to data processing systems and, more particularly, to electronic delivery systems.

B. Description of the Related Art

The world is quickly becoming wired. Nearly all households and businesses both have telephone and cable access. Now, more that ever, consumers may choose from a plurality of transmission mediums to access the Internet, such as cable, telephone, satellite, or some other high speed connection. As more consumers gain access to the Internet though a multitude of available transmission mediums, things previously done in the real world are now available through the Internet using at least one of the transmission mediums.

Probably the most commercialized use of the Internet is the World Wide Web. Every day, more people gain access to the Web, and every day, people are using the Web to shop online. Online shopping provides a level of convenience consumers want, need and will soon demand. Electronic commerce or "e-commerce" is the term often used to refer, at least in part, to online shopping on the Web.

With the explosive growth of online shopping on the Internet, the need for online delivery of digital items has also considerably grown. Online delivery refers to delivery of electronic items using an electronic format in any transmission medium. For example, a book, movie, or even a single track from a CD may be delivered to a consumer as a digital item. Consumers desire these digital items delivered immediately in a format suitable for viewing or playback using a consumer device, such as a computer. With the number of online stores that provide digital delivery growing exponentially every year, consumer devices capable of ordering, receiving, and viewing have also become more prevalent.

For example, WebTV, a popular Internet consumer device, is capable of ordering, and receiving digital items using more than one transmission medium. That is, the WebTV device provides access to the Internet as well as access to a conventional TV. Although the WebTV device enables consumers to use multiple transmission mediums using the same device, it does so at the expense of limited upgradeability. A consumer cannot specify a new transmission medium for delivery, unless the WebTV device supports the transmission medium. Even more so, any cross coupling of transmission mediums is provided at the WebTV device. And, in most instances, when shopping online using the WebTV device, the consumer initiates the shopping session by visiting a site. Only at that time, may the consumer then select an item to purchase, and then have the item delivered to the WebTV device.

Therefore, there is a need for a system capable of centralizing the cross coupling of transmission mediums with limited configuration requirements at a consumer's location. Such a system not only permits a consumer to shop online using one transmission medium and receive a purchased item using a different transmission medium, but also it permits easy upgrades, or the addition of new transmission mediums without having to modify any consumer device.

SUMMARY OF THE INVENTION

Methods and systems consistent with the present invention provide a cross channel fulfillment system that enables consumers to purchase and receive items using different transmission mediums. The fulfillment system is a centralized distribution system that maintains information relating to consumers and has access to multiple transmission mediums. Specifically, the fulfillment system contains a database of consumer contact information relating to each transmission medium. The fulfillment system uses a remote device to provide information to consumers. The remote device transmits and receives broadcast messages including information relating to purchasable items. The fulfillment system may deliver a purchased item to the consumer using a medium different from that used to purchase the item.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Methods and systems consistent with the present invention provide a cross channel fulfillment and delivery system that transmits and receives information relating to purchasable items to and from consumers using multiple transmission mediums. Such methods and systems enable consumers to automatically and electronically receive purchased items from the fulfillment system using a different medium than used to purchase the items.

Methods and systems consistent with the present invention also provide consumers an interface associated with a remote device to facilitate purchasing purchasable items. A consumer may select a displayed item on the consumer interface to purchase. For example, a consumer may select digital songs or software to be delivered. A client device, capable of receiving and using the items, receives the purchasable items.

Figure 1:
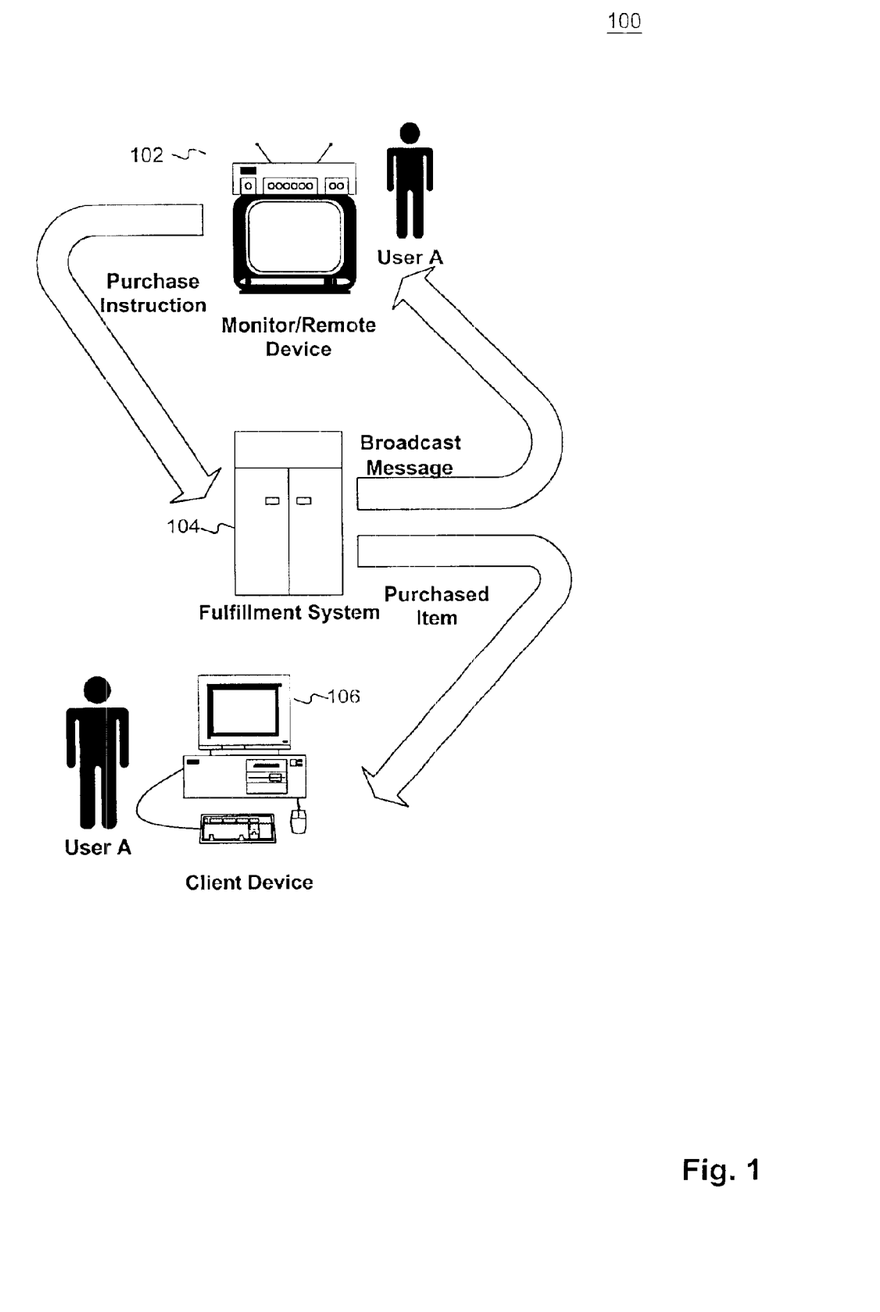
FIG. 1 is a schematic representation of the architecture of a network in a manner consistent with the principle of the present invention.

FIG. 1 shows a block diagram of the architecture of a cross channel fulfillment system 100 in a manner consistent with the principles of the present invention. System 100 contains a remote device 102, fulfillment system 104, and a client device 106. Remote device 102 enables consumers to view purchasable items using a video display, such as a television monitor, and select purchasable items using an input device, such as an infrared controller. Remote device 102, placed at a consumer location, receives broadcast messages from fulfillment system 104 and transmits purchase instructions to fulfillment system 104 using any broadcast medium, such as radio waves. A purchase instruction may include information, such as purchase information (e.g., PIN number, credit cards), delivery information (e.g., e-mail address), and/or information identifying the items to purchase (e.g., SKU). The purchase information, along with a remote device identification, is transmitted to fulfillment system 104 for processing. Remote device 102 also contains a caching mechanism for storing recently received broadcast messages in case the consumer does not initially see or hear the broadcast message. In addition remote device 102 may transmit the purchase information realtime, periodically on a scheduled basis, or when polled by fulfillment system 104.

When a purchase instruction is received at fulfillment system 104, the system determines if the instruction is valid. To do so, the system locates, in various connected databases, records associated with the consumer. The records may include a remote device identification, a consumer identification, a PIN number, an e-mail address, and a payment identifier. System 104 cross references the remote device identification with the delivery information and payment information.

If the delivery information or payment information is incomplete or faulty, system 104 transmits a message to remote device 102 prompting a valid completion. Otherwise, the order is considered valid, and the item may be electronically sent to the consumer in a medium specified by the consumer when placing the order (e.g., e-mail delivery).

The cross channel fulfillment system provides a number of benefits over traditional electronic ordering systems. First, the fulfillment system broadcasts information corresponding to purchasable items to a plurality of consumers. This simple approach enables the fulfillment system to make many offers to many consumers at the same time. Unlike traditional delivery systems where the consumer initiates the shopping session, the fulfillment system provides information relating to purchasable items to consumers without any consumer interaction. Moreover, by broadcasting the information, a consumer may first see (or listen) to the purchasable item before deciding whether to purchase it. That is, since the remote device stores the broadcasted information for a period of time (e.g., in cache) after the broadcast, a consumer unable to initially view the broadcast may still purchase the items. Second, the system manages multiple transmission mediums from a centralized location (e.g., Internet, cable, satellite). Any updates to the remote devices, or new transmission mediums for delivery are easily implemented at the centralized location instead of having to individually upgrade each remote device that converges multiple transmission mediums. A centralized database maintains all transmission mediums, including which consumers may use which mediums for delivery. Third, the fulfillment system easily implements non-real time back channel delivery to a consumer's location. That is, if there is excessive load at the time a consumer transmits a purchase instruction to the fulfillment system, the system delivers the purchased items at a later time. Since the delivery may be on a transmission medium different from the medium used to order the item, the fulfillment system can take advantage of the non-real time fulfillment.

Finally, the fulfillment system links consumer records in a centralized location. This helps minimize outstanding consumer records for various transmission mediums since the system maintains a database that can be used to cross reference the transmission mediums.

System Architecture and Operation

Figure 2A:
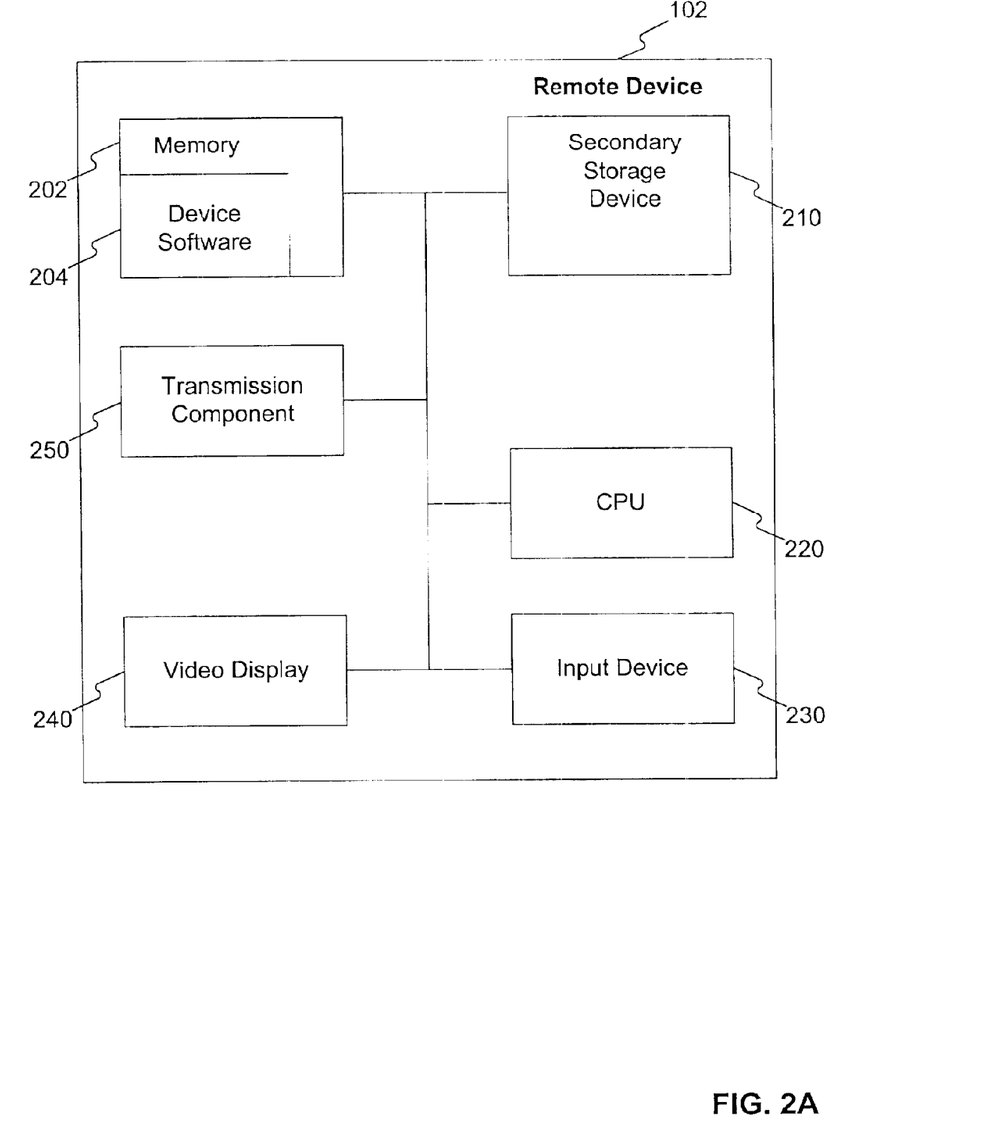
FIG. 2A depicts a more detailed diagram of the remote device depicted in FIG. 1.

FIG. 2A depicts a more detailed diagram of remote device 102, which contains a memory 202, a secondary storage device 210, a CPU 220, an input device 230, a video display 240, and a transmission component 250. Memory 202 contains device software 204 that enables a consumer to send instructions to fulfillment system 104. An instruction may be a request to purchase digital items, such as the digital version of books or music. Secondary storage device 210 contains unique identification information that identifies remote device 102, such as an identification number and other information identifying the consumer. Transmission component 250 communicates with fulfillment system 104 by receiving broadcast messages and sending purchase instructions. For example, transmission component 250 may communicate with fulfillment system 104 using radio waves. One skilled in the art will appreciate that remote device 102 may be composed of separate components, such as a set-box for a television, decoder device, and a storage device (e.g., external hard drive, or network storage device).

Figure 2B:
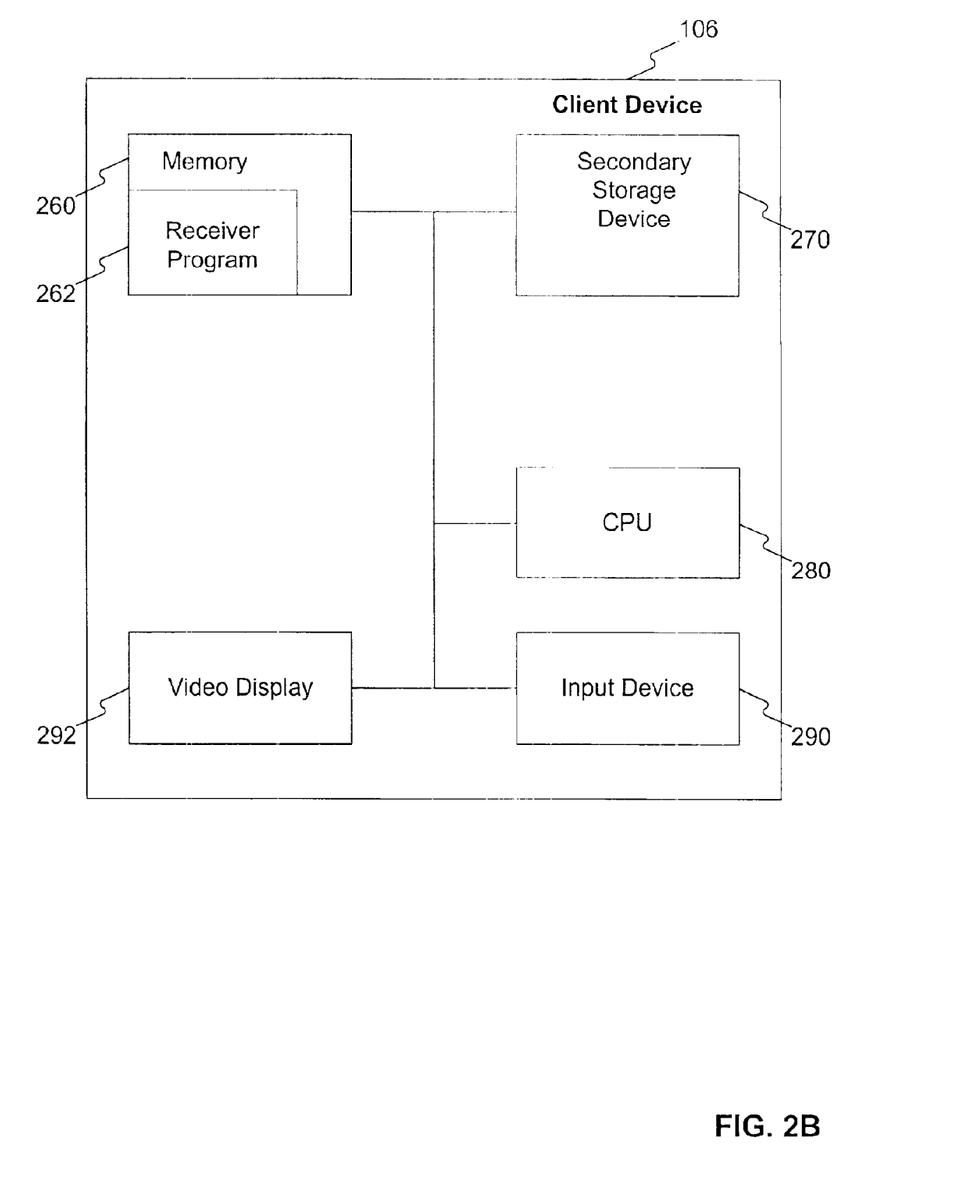
FIG. 2B depicts a more detailed diagram of the client device depicted in FIG. 1.

FIG. 2B depicts a more detailed diagram of a client device 106, which contains a memory 260, a secondary storage device 270, a central processing unit (CPU) 280, an input device 290, and a video display 292. Memory 260 includes a receiver program 262 that allows a consumer to receive digital items in a different transmission medium different from the transmission medium used for the broadcast message. For example, a receiver program 262 may be an e-mail program, such as the Eudora e-mail client, from Eudora.

Figure 3:
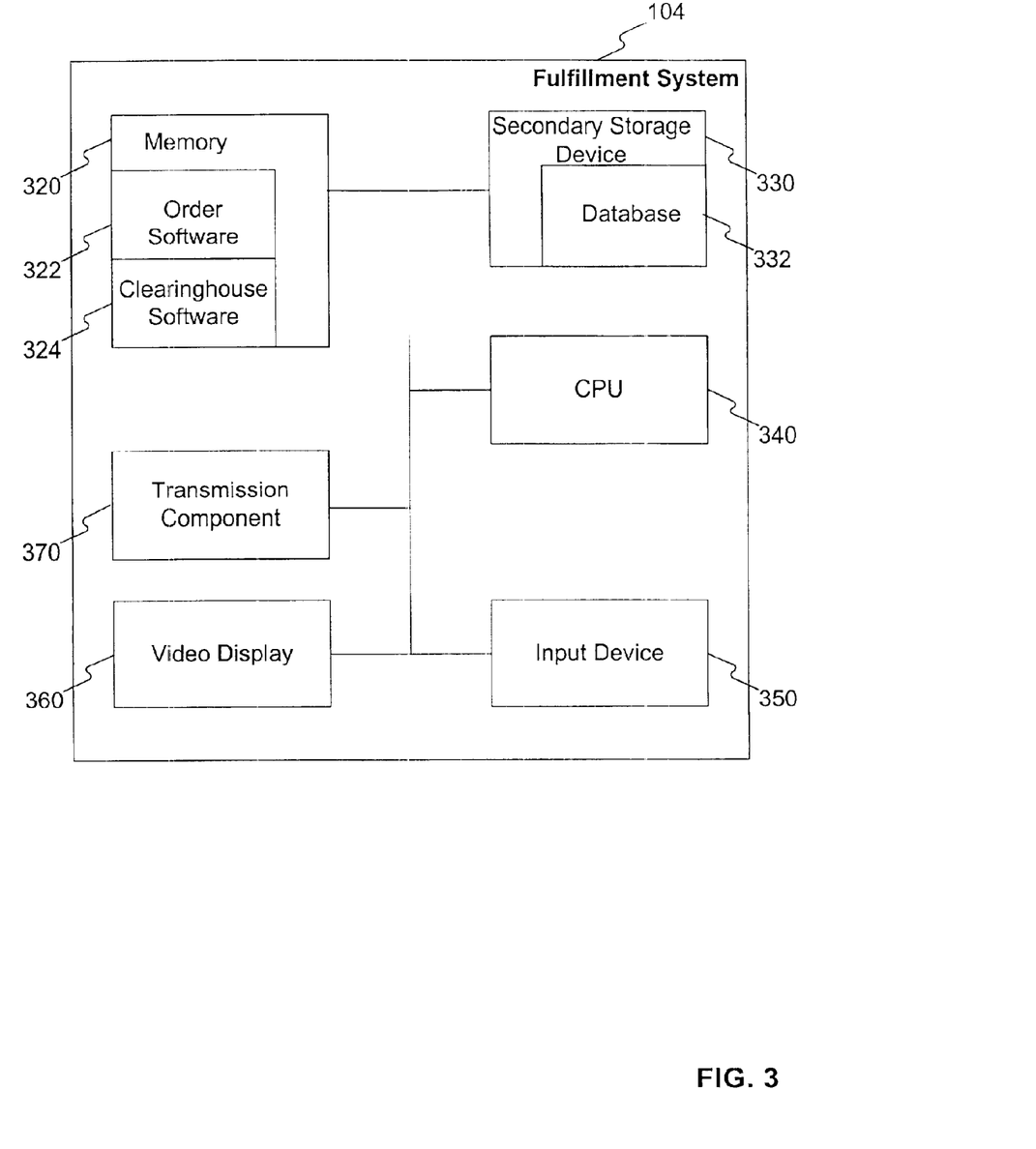
FIG. 3 depicts a more detailed diagram of the fulfillment system depicted in FIG. 1.

As shown in FIG. 3, fulfillment system 104 includes a memory 320, a secondary storage device 330, a CPU 340, an input device 350, a video display 360, and a transmission component 370. Memory 320 includes order software 322 and clearing house software 324. Order software 322 determines whether the consumer is authorized to purchase the purchasable item. Clearinghouse software 324 cross references remote device identifications with consumer delivery information as well as payment information. Clearinghouse software also transmits purchasable items to client device 106. Secondary storage device 330 contains a database 332 that correlates information associated with each consumer, such as remote device 102 information and client device 106 information, further described below. Transmission component 370 transmits broadcast messages to and receives purchase instructions from a remote device 102.

Figure 4:
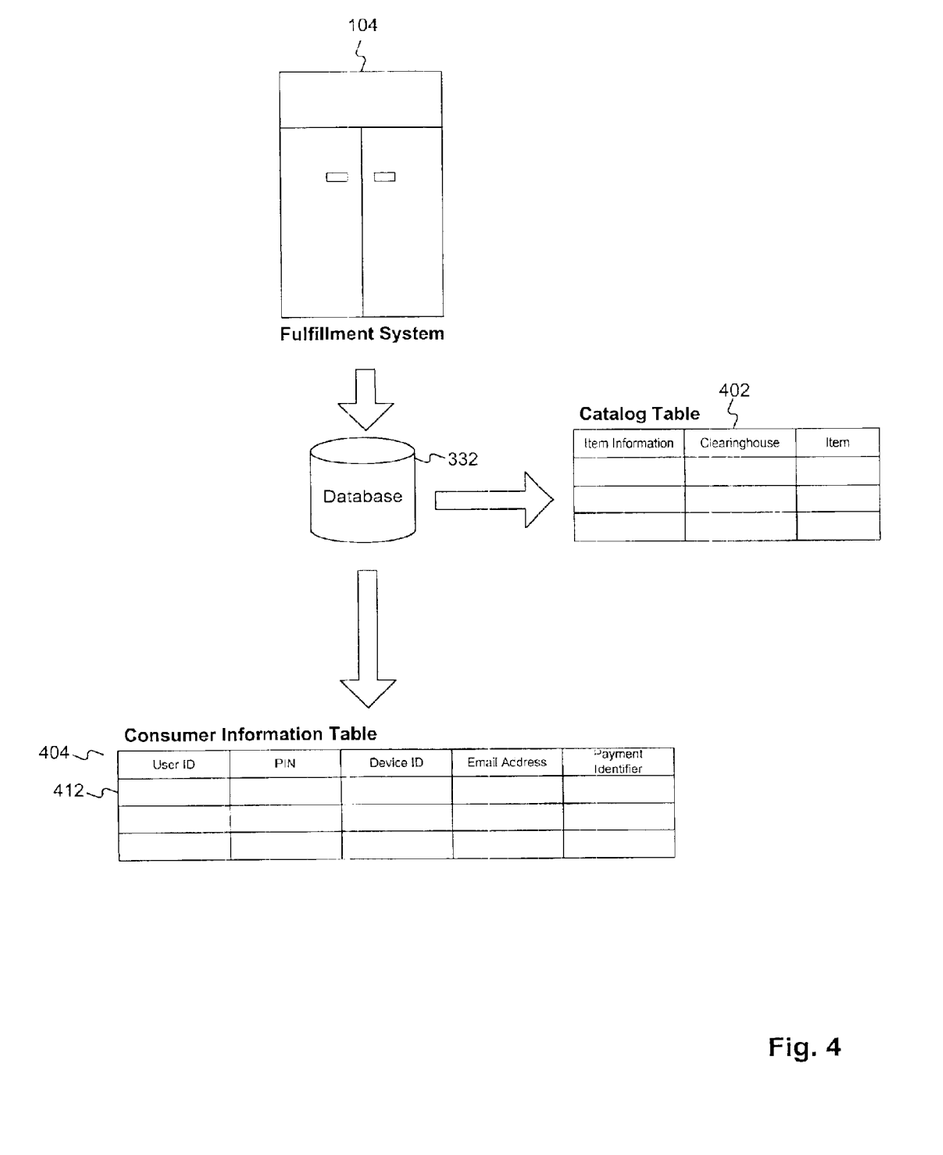
FIG. 4 illustrates a fulfillment system and its relationship to a database in a manner consistent with the principles of the present invention.

As shown in FIG. 4, database 332 contains a catalog information table 402 and a consumer information table 404. Catalog information table 402 contains information associated with all purchasable items, such as a unique identification number, purchasable item name, and a digital representation of the purchasable item Consumer information table 404 contains consumer information corresponding to consumers able to purchase items. For example, a consumer may be able to purchase items if the consumer has previously registered with fulfillment system 104. In such a case, consumer information table 404 may indicate so. A consumer may register with fulfillment system 104 by submitting billing, payment, and identification information (e.g., PIN). A record 412 includes for each consumer: a consumer identification; a PIN; a remote device identification; delivery information (e.g., e-mail address); and a payment information (e.g., credit card) One skilled in the art will appreciate that tables 402, 404 may contain additional information, and may be located in multiple databases. For example, an Internet Service Provider (ISP) may contain information relating to the delivery information, whereas a cable operator may contain information relating to payment information and consumer information.

Figure 5:
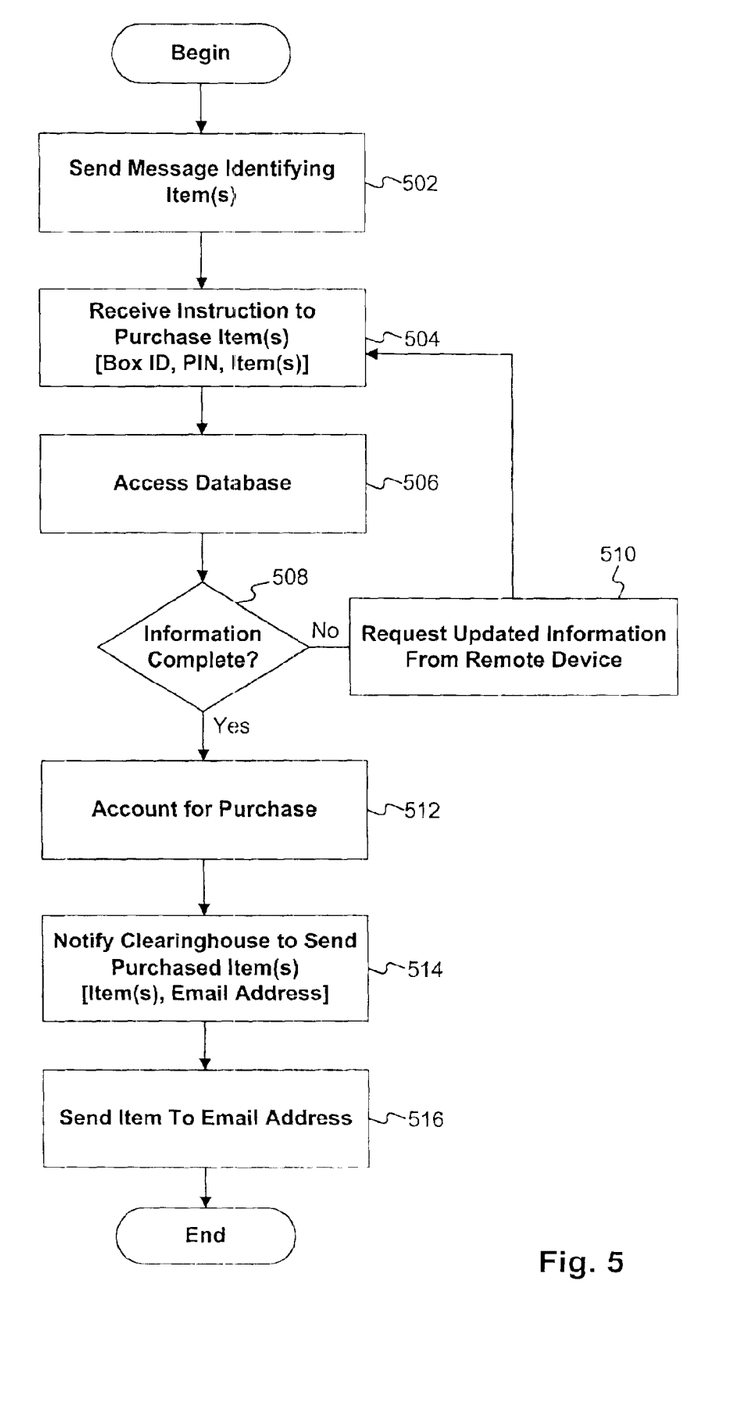
FIG. 5 depicts a flow chart of the steps performed by the fulfillment system of FIG. 1 in a manner consistent with the principles of the present invention.

FIG. 5 depicts a flow chart of the steps performed by fulfillment system 104. First, fulfillment system 104 transmits a broadcast message identifying purchasable items to a remote device 102 (step 502). Fulfillment system 104 uses transmission component 370 to communicate with remote device 102. In response, if a consumer purchases an item, fulfillment system 104 receives a purchase instruction (step 504). The instruction may include a remote device 102 identification, a consumer PIN, a list of items purchased by the consumer, and a delivery instruction. The instruction may be sent in a transmission medium similar to the broadcast in step 502.

Once fulfillment system 104 receives the instruction, fulfillment system 104 then accesses database 332 to verify the purchase instruction (step 506). Fulfillment system 104 locates a record 412 that corresponds to the consumer identification. Fulfillment system 104 checks if consumer supplied PIN corresponds to the PIN listed in record 412 (step 508). If the PINs do not match, or if there is other incomplete information (e.g., missing PIN, payment information, or items) fulfillment system 104 may transmit a message to remote device 102 requesting reverification and/or updated information (step 510). However, if the PINs match, fulfillment system 104 first accounts for the purchase (step 512). To account for the purchase, fulfillment system 104 may perform a bulling function, such as charging the consumer's credit card, or creating a billing record to send to the consumer.

Once the purchase is accounted for, order software 322 may notify clearinghouse software 324 to transmit the item to the consumer using the delivery method indicated in the purchase instruction (step 514). The notification may contain an item identification and a consumer identification. In most instances, the delivery method will be a transmission medium different from the transmission medium used for the broadcast message. Once clearinghouse software 324 receives the notification, clearinghouse software 324 may access database 332 to locate a delivery address and transmits the item to client device 106 (step 516).

Figure 6:
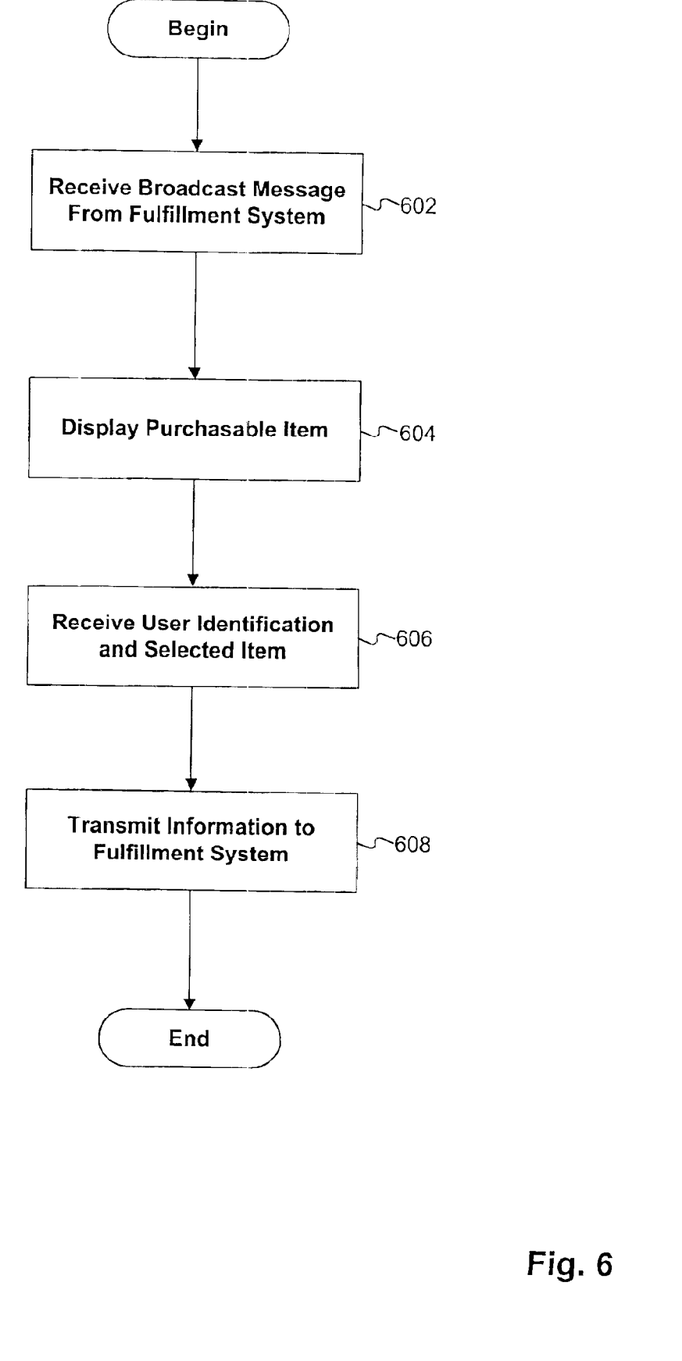
FIG. 6 depicts a flow chart of the steps performed by remote device of FIG. 1 in a manner consistent with the principles of the present invention.

FIG. 6 depicts a flow chart of the steps performed by remote device 102. First, remote device 102 receives a broadcast message from fulfillment system 104 (step 602). The broadcast message contains information identifying a purchasable item as well as the purchasable item itself. For example, in the case of music, the broadcast message may include a single track from a CD as well as the CD identification (e.g., SKU number). This way, the consumer may first listen to the CD and, if the consumer decides to purchase the CD, may do so by using the CD identification to create a purchase instruction. If however, the consumer does not immediately access remote device 102, the broadcast message may be stored for a predetermined period of time in memory 202 of remote device 102. This way, the consumer may access the broadcast message at a later period.

If the consumer decides to purchase the purchasable item, remote device 102 transmits a response to the broadcast message to fulfillment server 104, as described above. Once received at fulfillment server 104, remote device 102 may display the purchasable item on video display 260 (step 604). For example, the broadcast message may be an audio clip from a CD, or a textual message describing a digital book. The message may be stored in secondary storage device 210 so that the consumer may later purchase a purchasable item. If the consumer purchases an item, remote device 102 receives the consumer's PIN number, and an item identification (step 606). Next, remote device 102 transmits the consumer information, identification of the selected item to be purchased, and remote device 102 identification information as a purchase instruction to fulfillment system 104 (step 608). In doing so, fulfillment system 104 may then determine if the purchase instruction is complete and complete the purchase.

CONCLUSION

As explained, systems consistent with the present invention overcome the shortcomings of existing systems by providing a cross channel fulfillment system that enables consumers to purchase and receive items using different transmission mediums.

Although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network like the Internet; or other forms of ROM or RAM. Additionally, although specific components and programs of various computers and various servers have been described, one skilled in the art will appreciate that these may contain additional or different components or programs.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems.

What is claimed is:

1. A method for purchasing items available for electronic delivery in a network, comprised of a fulfillment system configured to broadcast messages to consumers without the consumers initiating the broadcast, the broadcast messages identifying purchasable items available for electronic delivery by the consumers interacting with the broadcast messages and a set of first remote devices configured to receive the broadcast messages, enabling the consumers to view information about the purchasable items and to select the purchasable items, wherein the fulfillment system receives instructions identifying the selected purchasable items and delivers the selected purchasable items to the consumers electronically, the method comprising the steps of:

receiving at each first remote device a message broadcast from the fulfillment system without the consumer initiating the broadcast, the broadcast message identifying a purchasable item available for electronic delivery by said consumer interacting with the broadcast message, wherein the broadcast message is transmitted from the fulfillment system to the first remote devices using a first transmission type medium;

presenting information about the selected purchasable item identified in the broadcast message to the consumer;

receiving at a particular one of the first remote devices associated with one of the consumers an instruction generated by the consumer's interaction with the broadcast message, wherein the instruction indicates the consumer's request to deliver the item electronically to a second client device;

transmitting information from the particular first remote device to the fulfillment system, wherein the transmitted information reflects the received instruction; and delivering, by the fulfillment system to the second client device associated with the consumer associated with the particular first remote device at which the instruction was received, the item requested for purchase by the consumer using a second transmission type medium to deliver the requested item electronically, wherein the second transmission type medium is different from the first transmission type medium used for the broadcast message.

2. The method of claim 1, further comprising the step of:
maintaining at the fulfillment system a memory containing information associating each first remote device with a consumer.

3. The method of claim 1, further comprising the step of:
maintaining at the fulfillment system a memory containing data associating each first remote device with information about the second client device associated with each consumer with which the fulfillment system delivers items requested for purchase.

4. The method of claim 1, wherein the step of delivering the item electronically to the second client device associated with the consumer associated with the particular first remote device at which the instruction was received, includes:
determining whether the consumer is permitted to purchase the item.

5. The method of claim 4, wherein the determining step includes the step of:
accessing credit information associated with the consumer using a payment identifier associated with the consumer.

6. The method of claim 5, wherein the payment identifier is provided as part of the information transmitted from the particular first remote device to the fulfillment system.

7. The method of claim 1, wherein the fulfillment system transmits and receives information relating to items available for electronic delivery to and from consumers using multiple transmission type mediums.

8. The method of claim 7, wherein the fulfillment system maintains a database that contains information relating to a consumer's access to multiple transmission type mediums.

9. The method of claim 1, wherein each first remote device maintains a set of previously broadcasted messages for a predetermined period of time.

10. A system for purchasing items available for electronic delivery in a network, the system comprising:
a fulfillment system configured to broadcast messages to consumers without the consumers initiating the broadcast, the broadcast messages identifying purchasable items available for electronic delivery by the consumers interacting with the broadcast messages;
a set of first remote devices configured to receive the broadcast messages, enabling the consumers to view information about the purchasable items and to select the purchasable items, wherein the fulfillment system receives instructions identifying the selected purchasable items and delivers the selected purchasable items to the consumers electronically;

means for receiving at each first remote device a message broadcast from the fulfillment system without the consumer initiating the broadcast, the broadcast message identifying a purchasable item available for electronic delivery by said consumer interacting with the broadcast message, wherein the broadcast message is transmitted from the fulfillment system to the first remote devices using a first transmission type medium;

means for presenting information about the selected purchasable item identified in the broadcast message to the consumer;

means for receiving at a particular one of the first remote devices associated with one of the consumers an instruction generated by the consumer's interaction with the broadcast message, wherein the instruction indicates the consumer's request to deliver the item electronically to a second client device;

means for transmitting information from the particular first remote device to the fulfillment system, wherein the transmitted information reflects the received instruction; and means for delivering, by the fulfillment system to the second client device associated with the consumer associated with the particular first remote device at which the instruction was received, the item requested for purchase by the consumer using a second transmission type medium to deliver the requested item electronically, wherein the second transmission type medium is different from the first transmission type medium used for the broadcast message.

11. The system of claim 10, wherein the fulfillment system comprises:
a memory containing information associating each first remote device with a consumer.

12. The system of claim 10, wherein the fulfillment system comprises:
a memory containing data associating each first remote device with information about the second client device associated with each consumer with which the fulfillment system delivers items requested for purchase.

13. The system of claim 10, wherein the delivery means includes:
means for determining whether the consumer is permitted to purchase the item.

14. The system of claim 13, wherein the determining means includes:
means for accessing credit information associated with the consumer using a payment identifier associated with the consumer.

15. The system of claim 14, wherein the payment identifier is provided as part of the information transmitted from the particular first remote device to the fulfillment system.

16. The system of claim 10, wherein the fulfillment system transmits and receives information relating to items available for electronic delivery to and from consumers using multiple transmission type mediums.

17. The system of claim 16, wherein the fulfillment system includes:
a database that contains information relating to a consumer's access to multiple transmission type mediums.

18. The system of claim 10, wherein each first remote device includes:

means for maintaining a set of previously broadcasted messages for a predetermined period of time.

19. The system of claim 10, wherein the fulfillment system includes:

means for storing at least one table including an identifier for each first remote device and data indicating a delivery address for transmitting items electronically to the second client devices associated with the consumers in response to the received purchase instructions.

20. The system of claim 19, wherein the data indicating a delivery address for transmitting items electronically to the second client devices associated with the consumers in response to the received purchase instructions, includes:

information about the transmission type medium for the delivering means to transmit items electronically to each of the second client devices.

21. The system of claim 10, wherein the set of first remote devices includes a set-top box.

\* \* \* \* \*